June 3, 1969  N. VISLOCKY  3,448,403
LASER STRUCTURE WITH LASER ELEMENT INSERTED CONCENTRICALLY
WITHIN CYLINDRICAL LIGHT PUMP TUBE
Filed Jan. 15, 1964  Sheet _1_ of 2

INVENTOR
NICHOLAS VISLOCKY

BY  *Fidelman & Wolffe*

ATTORNEYS

United States Patent Office 3,448,403
Patented June 3, 1969

3,448,403
LASER STRUCTURE WITH LASER ELEMENT INSERTED CONCENTRICALLY WITHIN CYLINDRICAL LIGHT PUMP TUBE
Nicholas Vislocky, 65 St. Marks Place,
New York, N.Y. 10003
Filed Jan. 15, 1964, Ser. No. 337,897
Int. Cl. H01s 3/02
U.S. Cl. 331—94.5                                  8 Claims

ABSTRACT OF THE DISCLOSURE

The present invention relates to an improved laser structure consisting of a laser element in the form of a cylindrical crystal rod and a light pump defined by a transparent inner cylindrical tube disposed concentrically outwardly of the laser element, and equal length transparent outer cylindrical tube having a fully reflective covering on the outer surface thereof, means sealing the space between the inner and outer tubes at the ends thereof, and a pair of circular electrodes mounted co-axially between the tubes, one at each end thereof and connected through an adjacent sealing means to a source of electrical current. The light pump may be modified to form a gas laser by providing a semi-reflective material coating on the inner surface of the inner cylindrical tube.

---

This invention relates to the generation and amplification of infrared, and visible radiation, particularly to the generation and amplification of such radiations in devices of the type generally termed "lasers."

The maser (microwave amplification by stimulated emission of radiation) and the companion laser are of a group of new quantum electronic devices whose operation is quite different from that of vacuum tubes, or even transistors. Atoms of a specific material are given energy to change their orbital states; when this external energy affects enough atoms, the stored energy can be triggered by a weak signal so that the atoms give off RF energy at a frequency that is identical to the applied signal. An early model of maser worked with ammonia gas (Townes et al.—Columbia University, 1953); but since that time, it has proven feasible to produce both solid-state and gas devices, operated at either room temperature, or cooled to low temperatures, for improved operation. The maser led to the optical maser, or laser (light amplification by stimulated emission of radiation); the laser promising to out-strip the maser in importance.

The optical portion of the spectrum is a new and almost-unfamiliar region to those accustomed to thinking of frequency in terms of megacycles. Wavelengths are so short that the angstrom ($1 \times 10^{-10}$ meter) is used to define these waves. In this region, a typical optical maser operates at about 6,330 angstroms, or 470 teracycles ($10^{12}$ cycles). At longer wavelengths in the infrared region, typical lasers operate between 11,114 angstroms (268.3 teracycles) and about 21,189 angstroms (137.1 teracycles), depending on the type of element used in each device. At least one recent optical maser worked in the visible (red) light region.

In some ways, the laser's operation is similar to that of a common fluorescent tube. All fluorescence hinges on the fact that fluorescent materials are able to absorb energy of one frequency and release it at another frequency. Normally, any given electron is in its so-called "ground state." But when it absorbs energy from outside it moves to a higher energy state. In the fluorescent tube, for example, the electrons in the thin fluorescent coating absorb energy in the form of photons from an ultraviolet source built into the tube. In the process, they jump from one atomic orbit to another, where they contain more potential energy. The high-energy state, though, is an unstable one, and a few microseconds later the electrons fall back to their normal lower energy level. During this process, they must get rid of the extra energy they absorb. The electrons do this by radiating the excess energy as light. Almost always, the light radiated is of a lower frequency than that which was originally absorbed. This is true in the fluorescent light, for example, where the white light given off is considerably lower in frequency than the ultraviolet which excited the electrons in the first place.

The laser's fluorescent material is either a combination of gases or synthetic ruby made of aluminum oxide with a sprinkling of chromium atoms. The chromium absorbs green light of a certain frequency from an intensely bright flash tube or neon light, called a light pump, which raises its electrons to a high level. When they fall back to the normal low-energy level, they fluoresce and give of a coherent, monochomatic light in a very concentrated beam. The light resulting from natural fluorescence, though, is as incoherent as any other light. To make the ruby into a laser, each electron must be coaxed into radiating its energy in phase with all the others.

Although resonance in crystals and other materials is often encountered the most unusual characteristics of the laser is that oscillations are controlled and stimulated, by the device itself, so the output of light waves is coherent. This means the output is monochromatic, unipolarized and uniphased.

Early solid-state lasers were pulsed units. The excited electron supply was quickly depleted when laser action began and normal output was a series of high-intensity pulses usually lasting about a millisecond. Pulse rates of one to four or five a minute were common. Recently, pulse rates of ten per second have been achieved. By 1961, Bell Labs' scientists had built and demonstrated a different kind of laser containing a mixture of helium and neon as the active medium. The gas laser operated continuously, but was inherently a much lower powered device than the solid-state version.

Laser have features which make then useful for a wide variety of applications. First, the laser has an extremely high power. Secondly, the laser produces an extremely high frequency radio-like coherent signal. The third feature is that the laser produces a very narrow beam of energy. And fourth it has an extremely small spot focus; under controlled conditions laser beams spread less than 2 feet in a mile. In comparison sun light would disperse as much as 100 yards.

There are at least six potential applications of lasers:

(1) Radar.—The laser will allow tracking and ranging with extremely narrow beams, resulting in high-resolution information.

(2) Measurements.—This device will allow microinch positioning, gauging, and low-speed measurement.

(3) Chemical.—The intense beam of light is a highly selective catalyst which can cause the disruption of chemical bonds in small regions inside homogeneous substances.

(4) Medicine and biology.—The laser permits modification of surface tissue and actual retina welding in eye operations.

(5) Communications.—Lasers permit high-security beamed communications and relatively unlimited band width possibilities.

(6) Fabrication and processing.—As a light-beam knife, the laser will be used for microwelding and microetching of semiconductors and ultraminiature components.

The laser is a simple device to describe, but a difficult device to fabricate. In one form, it consists of a small ruby rod about 1 inch long and little more than ⅛ inch in diameter with the ends of the rod ground flat and coated with silver to act as reflectors. One end of the rod is not 100% reflective and consequently allows the transmission of some light energy. White light from the flash tube, used to excite the laser, is focused through the sides of the ruby adding energy to the chromium atoms within to raise their energy level.

As the electrons fall back to the normal state they emit light quanta in many different directions, some escaping through the sides of the rods some of the light radiated is reflected from the end mirrors and travels back down the length of the rod, striking other excited electrons, prodding them into releasing their excess energy. Fortunately, the light radiated by the triggered electrons is in phase with the beam which tripped the reaction. As the non-intensified light continues to travel through the ruby, more and more electrons are stimulated into giving up their energy, all in phase with the constantly building signal. It reaches one end, is reflected, and starts back on another trip through the tube. The light surges back and forth, and continues to build, until finally it is so powerful that a bright coherent flash of intense monochromatic light bursts forth from the lightly silvered end of the tube in a cascade of coherent light. The whole process, from pumping to output of the beam, takes only a few hundred miscroseconds.

Active element of most gaseous optical masers is a combination of inert gases—such as helium or neon—contained in a glass tube. This tube is pumped by a high-frequency signal of about 30 mc. to change energy levels. When the atoms of one gas are excited, they collide with atoms of the second gas. Energy is transferred in the form of infrared or visible light. In a resonant tube, the energy is stimulated to form a continuous high-energy beam of coherent light.

Output frequency depends upon the active elements—the inert gases. Helium-neon combinations produce visible light of about 6,328 angstroms. Combinations of neon-oxygen as well as argon-oxygen produce light waves in the near infrared region of 8,450 angstroms. Optical masers using a pure (noble) gas have also been developed. These produce a beam of coherent infrared radiation at more than a dozen wave-lengths between 16,900 and 21,890 angstroms. Cesium has been used to generate beams of 71,180 angstroms.

An important characteristic of this type of optical maser is that the output beam is several hundred times narrower than the output of crystal lasers. The two types—crystal and gaseous—tend to complement each other, since the gaseous laser is essentially a low-power device, the crystal laser, a high-power device.

The light pump used to stimulate the solid state laser has always been a problem. Expensive helical neon tubes have been built having a ruby crystal mounted axially therewithin. Also in use are light pumps consisting of four or more evenly spaced parallel cylindrical flash tubes spaced around the circumference of the ruby tube. Both arrangements are costly and inefficient.

In neither design does the light from the pump strike the entire surface of the crystal with equal intensity, the spaces between the helixes of the first described device not receiving as much light as the area directly below. In the multipump design, no matter how many flash tubes are used, the surface presented to the laser core is not contiguous and therefore the same problem arises.

Accordingly an object of the present invention is a simple laser structure which avoids the above discussed problems.

Another object of the present invention is a laser design utilizing a very simple light pump configuration.

A further object of the present invention is a laser capable of efficiently utilizing the light emanating from a neon or flash tube light pump uniformly applied to the ruby surface.

A still further object of the present invention is a compact laser structure utilizing a gas laser as a light pump for a crystal laser.

Still further objects will become apparent from the following detailed specification taken in conjunction with the accompanying drawings in which.

Figure 3:
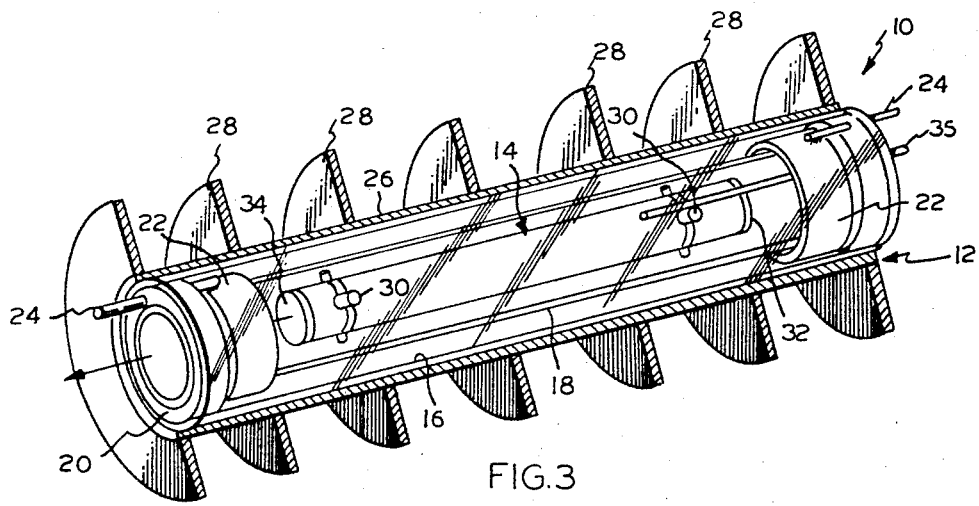
Figure 4:
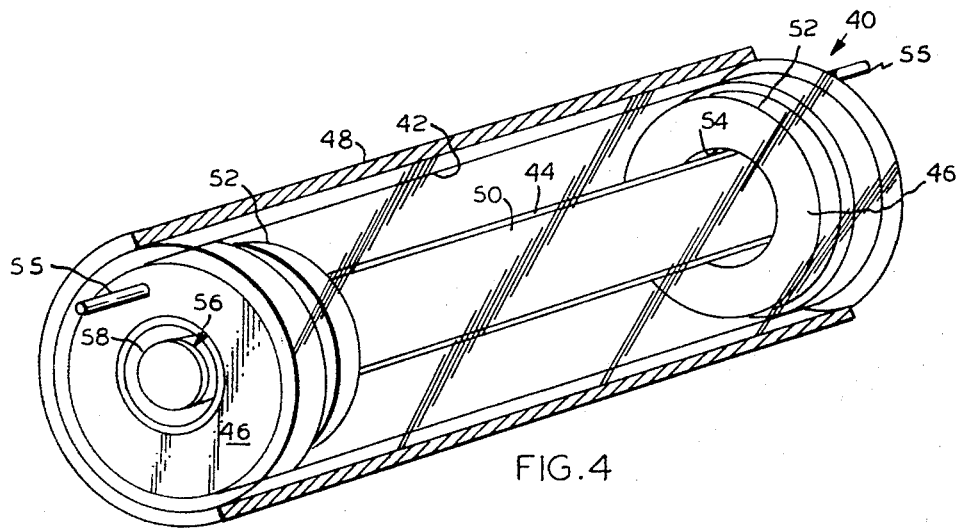

FIGURE 3 is a perspective view of a first embodiment of my invention illustrating a ruby laser encased within a hollow tubular flash tube and having an outer reflective coating and encircling cooling fins broken away from the near side thereof for clarity; and FIGURE 4 is a perspective view of a second embodiment of the invention illustrating a ruby laser encased within a tubular-shaped gas laser also having its outer reflective coating removed from a portion thereof for clarity.

Figure 1:
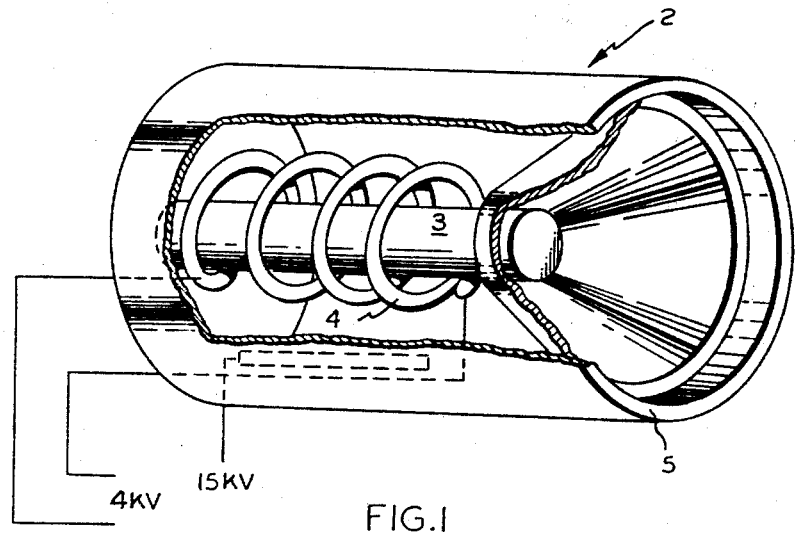
FIGURE 1 is a broken away perspective view of one form of the prior art lasers with a helical flash tube.

FIGURE 1 shows a prior art laser, generally designated 2, having a cylindrical ruby rod 3 surrounded by a helical flash tube 4 which is in turn surrounded by a coaxial reflective envelope 5.

Figure 2:
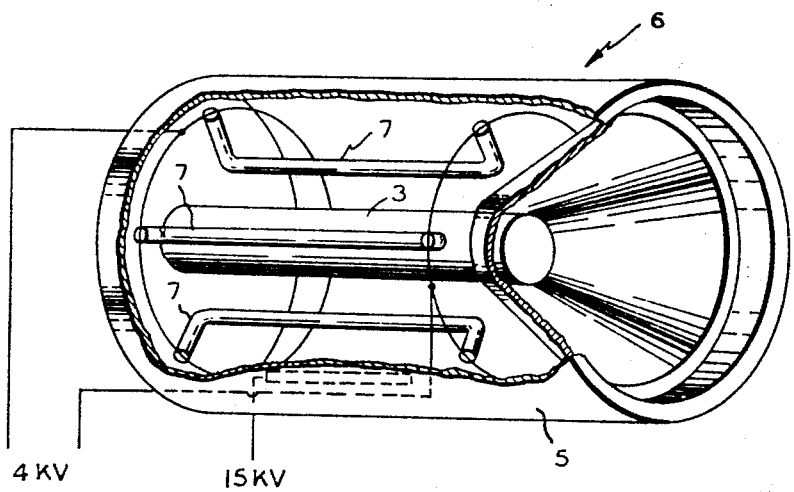
FIGURE 2 is a broken away perspective view of a second prior art laser utilizing multiple parallel flash tubes.

A similar prior art laser, generally designated 6, as shown in FIGURE 2, also uses a ruby rod 3 and a reflective envelope 5. The rod 3 has instead of the helical flash, four cylindrical flash tubes 7 spaced around the ruby rod 3.

In FIGURE 3 is shown a solid state laser of the present invention, generally designated 10, consisting of a hollow tube light pump 12 and a coaxial synthetic ruby rod 14. The envelope of the pump 12 consists of an outer cylindrical glass tube 16 and a coaxial inner cylindrical glass tube 18 held in proper relation by a ring like insulator 20 bonded between the ends of the cylindrical glass tubes 16, 18. The insulators 20 are sealed to the tubes 16, 18 to form a space therebetween filled with neon or any other gas capable of glowing brightly when excited by an electric current. A metallic circular band electrode 22 is coaxially mounted between the tubes 16, 18 at each end of the envelope. Each electrode 22 is fixed between the tubes 16, 18 by a terminal contact 24 soldered to the surface of the electrode 22 parallel to the axis thereof and extending through the insulator 20 in which it is rigidly fixed. A reflective coating 26 covers the outer surface of the outer tube 16 to direct all of the converted light directly into the surface of the ruby 14. A series of spaced circular cooling fins 28 may encircle the reflective coating of the pump tube 12 to radiate excess heat.

The synthetic ruby 14 is mounted coaxially within the pump tube 12 by a pair of spiders 30, or, alternatively perforated plates, a reflective coating 32 covers one planar end of the ruby tube 14 while the other planar end is covered by a semi-reflective coating 34. A trigger rod 35 is also mounted through the insulator 20 and extends along a side of the ruby 14.

An alternating electric current between the electrodes 22 causes the gas within the tube 12 to glow, the light from the light pump 12 being eventually all directed into the ruby 14 by the reflective coating 26 covering the outer tube 16. The light pulses caused within the ruby by the light pump travel axially, rebounding from the end coatings 32 and 34, until the intensity builds up to a point at which the high intensity light is emitted through the semi-transparent coating 34 in a straight line parallel to the axis of the ruby 14 by applying current to the trigger rod 35.

In FIGURE 4 is shown a second embodiment of the invention in which a gas laser 40 is used as the light pump. The gas laser is formed from an outer cylindrical glass tube 42 and an inner coaxial cylindrical glass tube 44. The tubes 42, 44 are held in proper relation by a pair of insulator rings 46 mounted between them at the ends thereof, sealing the inner and outer tubes 42, 44 to provide an air tight space therebetween containing neon and helium gases. A fully reflective coating 48 covers the outer surface of the outer tube 42 while a semi-reflective coating 50 overlies the inner surface of the inner tube 44. A coaxial circular plate electrode 52, having a central aperture 54, is contained within each end of the gas laser, held in place by a terminal contact 55 soldered to the outer face thereof and extending through the adjacent insulator 46 and rigidly fixed therein.

As in the first embodiment a ruby laser 56 is rigidly mounted coaxially within the gas laser by means not shown. One planar end (right end) of the ruby 56 laser has a reflective coating (not shown) while the other end has a semi-reflective coating 58. A trigger rod (not shown) extends between the inner glass tube 44 and the ruby rod 56.

An electric current passing between the plate electrodes 52 causes the helium electrons to become excited and form light pulses travelling from the outer reflective coating 48 to the inner coating 50 till the intensity builds up to a point at which coherent beams of light pass through the surface of the tube 44 and the coating 50. The light from the gas laser impinges on the surface of the ruby 56, entering the ruby and exciting the electrons of chromium to stimulate axial light pulses as in the above embodiment.

The use of a pair of cylindrical tubes to form the flash tube, as shown in FIGURE 3, simplifies the structure and permits a constant intensity light over the surface of the ruby rod. The gas laser stimulater, shown in FIGURE 4, further provides a light of higher intensity than the flash tube while requiring a lower voltage. Lasers of the present invention can be made smaller, lighter, and more economically than those of the prior art due to the simplified structure using only one straight flash tube.

It will be obvious to those skilled in the art that various changes may be made without departing from the spirit of the invention and therefore the invention is not limited to what is shown in the drawings and described in the specification, but only as indicated in the appended claims.

What is claimed is:
1. A device for converting radiation of one quantum energy into radiation of another quantum energy consisting of a cylindrical crystal rod having first and second planar ends, a fully reflective coating over said first planar end; a semi-reflective coating over said second planar end; a light pump consisting in part of a transparent outer cylindrical tube and an equal length transparent coaxial inner cylindrical tube, a fully reflective covering on the outer surface of the outer tube, means of annular configuration for sealing the annular space between the coaxial inner and outer tubes at the ends of said tubes, a circular electrode mounted co-axially between said tubes at each end thereof and provided with an electrical terminal extending through the sealing means, a said terminal being rigidly fixed therein, a source of electrical current connected across said terminals, said crystal rod mounted coaxially within said inner tube whereby the light emanating from the light pump is distributed evenly over the surface of the crystal rod stimulating the release of coherent radiation from the semi-reflective end of said crystal rod.

2. A device as recited in claim 1 wherein said crystal rod consists of a ruby containing traces of chromium.

3. A device as recited in claim 1 wherein said light pump is a neon light.

4. A device as recited in claim 1 wherein said light pump is a flash tube.

5. A device as recited in claim 4 wherein the sealed space between said tubes is filled with neon and helium.

6. A device for converting low voltage electrical energy into coherent monochromatic light consisting of a single hollow cylindrical gas laser light pump means adapted to convert the electrical energy into coherent monochromatic light energy radiating into the interior thereof and a coaxial solid state cylindrical crystal adapted to convert the light from the gas laser into an axial beam of coherent monochromatic light, said crystal being rigidly held within the hollow of said light pump means.

7. A device for converting radiation of one quantum energy into radiation of another quantum energy consisting of a cylindrical crystal rod having first and second planar ends, a fully reflective coating over said first planar end, a semi-reflective coating over said second planar end, a light pump consisting in part of a transparent outer cylindrical tube and an equal length transparent coaxial inner cylindrical tube, a fully reflective covering over the outer surface of the outer tube, means for sealing the space between the inner and outer tubes at the ends of said tubes, a circular electrode mounted co-axially between said tubes at each end thereof within the sealing means, an electrical terminal extending from each electrode through the adjacent sealing means, a source of electrical current connected across said terminals, said crystal rod mounted coaxially within said inner tube whereby the light emanating from the light pump is distributed evenly over the surface of the crystal rod stimulating the release of coherent radiation from the semi-reflective coated end of said crystal rod, a semi-reflective material coating the inner surface of said inner tube, the light pump being a gas laser.

8. A device for converting radiation of one quantum energy into radiation of another quantum energy consisting of a cylindrical crystal rod having first and second planar ends, a fully reflective coating over said first planar end, a semi-reflective coating over said second planar end, a light pump consisting in part of a transparent outer cylindrical tube and an equal length transparent coaxial inner cylindrical tube, a fully reflective covering over the outer surface of the outer tube, means for sealing the space between the inner and outer tubes at the ends of said tubes, a circular electrode mounted coaxially between said tubes at each end thereof within the sealing means, an electrical terminal extending from each electrode through the adjacent sealing means, a source of electrical current connected across said terminals, said crystal rod mounted coaxially within said inner tube whereby the light emanating from the light pump is distributed evenly over the surface of the crystal rod stimulating the release of coherent radiation from the semi-reflective coated end of said crystal rod, a plurality of radially outwardly extending cooling fins mounted on the outer surface of the outer tube, said fins being equally spaced axially of said outer tube.

References Cited
UNITED STATES PATENTS 3,262,004  7/1966  Keller _____ 331—94.5
3,353,115  11/1967  Maiman _____ 331—94.5

DAVID SCHONBERG, *Primary Examiner.*

P. R. MILLER, *Assistant Examiner.*